(No Model.) 2 Sheets—Sheet 1.
G. H. EARNEST.
HAY TEDDER.
No. 467,224. Patented Jan. 19, 1892.
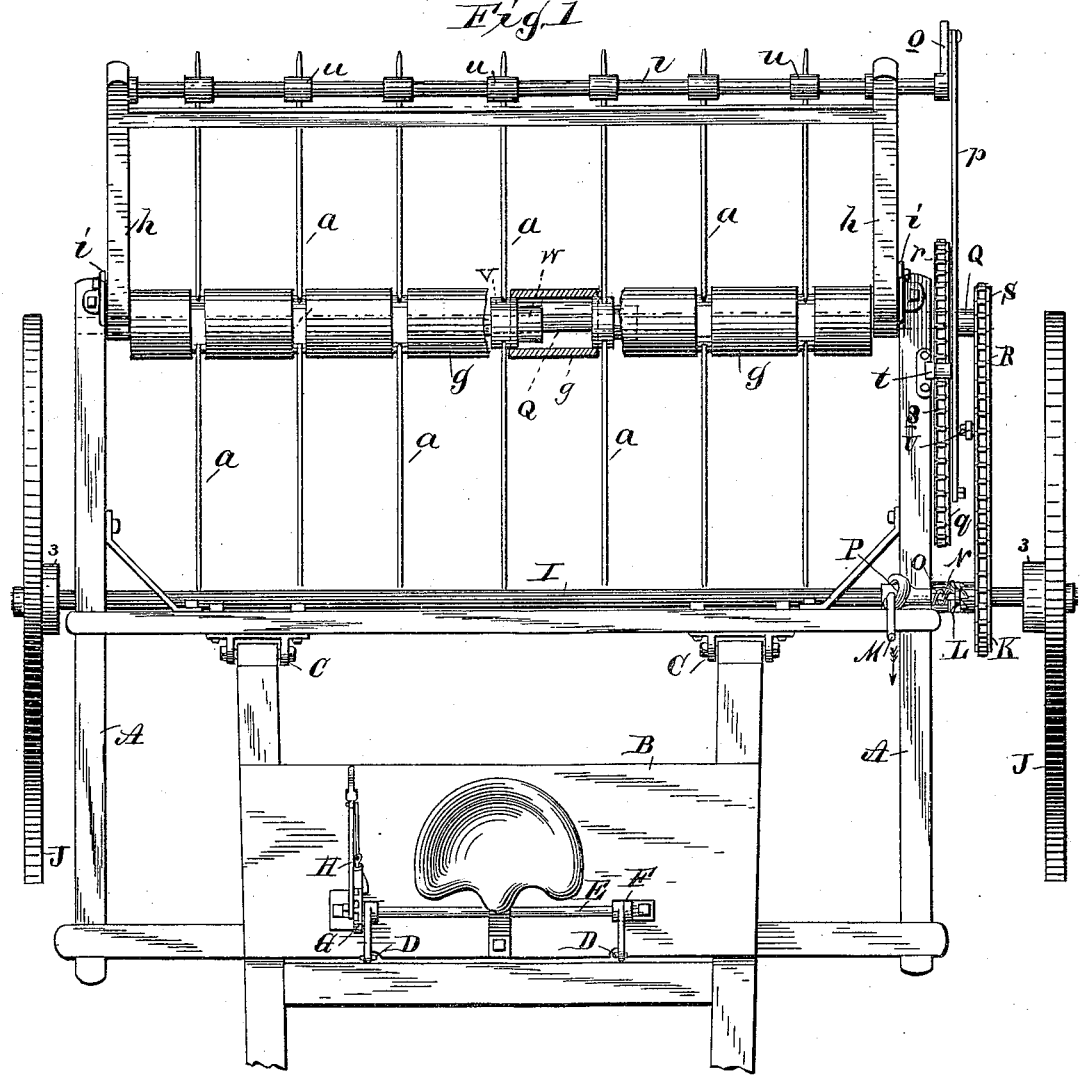
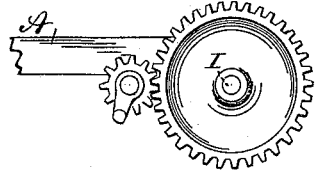
WITNESSES
W. C. Lloyd
Jas. H. Mahan
INVENTOR
George H. Earnest,
By H. A. Toulmin
his Attorney.

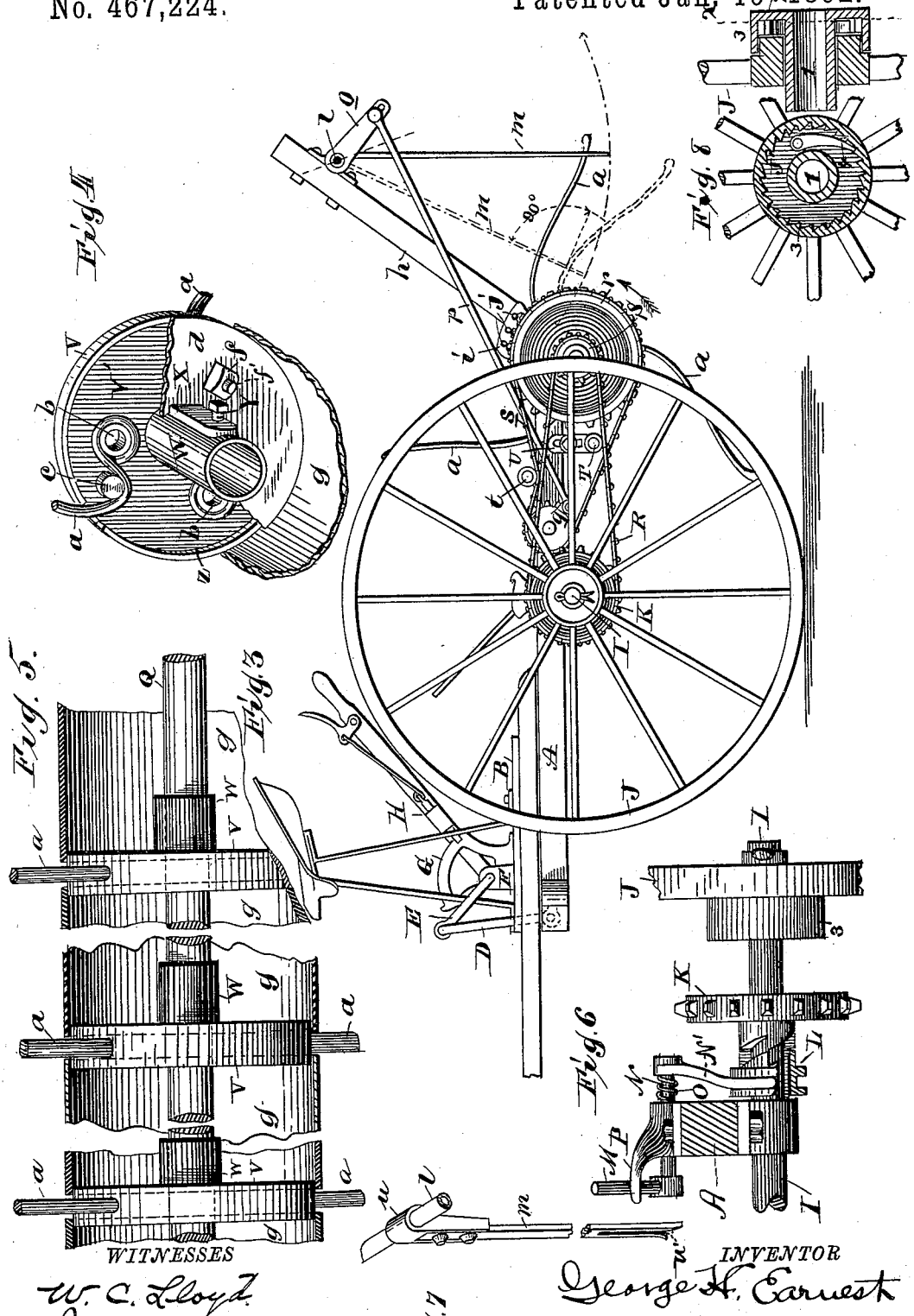

UNITED STATES PATENT OFFICE.

GEORGE H. EARNEST, OF SPRINGFIELD, OHIO, ASSIGNOR OF ONE-HALF TO THE ROGERS FENCE COMPANY, OF SAME PLACE.

HAY-TEDDER.

SPECIFICATION forming part of Letters Patent No. 467,224, dated January 19, 1892.

Application filed January 30, 1888. Serial No. 262,347. (No model.)

*To all whom it may concern:*

Be it known that I, GEORGE H. EARNEST, a citizen of the United States, residing at Springfield, in the county of Clark and State of Ohio, have invented certain new and useful Improvements in Hay-Tedders, of which the following is a specification, reference being had therein to the accompanying drawings.

This invention relates to certain new and useful improvements in hay-tedders, the special features of which will be hereinafter described, and pointed out in the claims.

In the accompanying drawings, forming a part of this specification, and on which like reference-letters and numerals indicate corresponding parts, Figure 1 represents a plan view of my improved hay-tedder entire; Fig. 2, a detail side view of a portion of the main frame, a modified form of the tedder-shaft gear, and the pinion and crank which actuate the clearer-shaft; Fig. 3, a side elevation of the machine entire; Fig. 4, a detail perspective view, partly in section, of one of the fork-holders and inclosing pipes; Fig. 5, a detail partial side elevation and sectional view of the same parts; Fig. 6, a detail section and elevation of the frame, the axle and wheel, and the sprocket and the clutch devices; Fig. 7, a detail perspective view of the rock-shaft, a clearer-arm, and a coupling; Fig. 8, detail perspective views of one of the wheel-hubs and associate pawl-and-ratchet devices.

The letter A designates the main frame of the machine, to which the thill-frame B is hinged or otherwise connected at C, these frames being of the ordinary or any approved construction. The forward end of the main frame and the thill-frame are adjustably connected together by links or rods D, pivoted to the former and pivotally connected with the crank-shaft E, mounted in bearings F, carried by the platform of the thill-frame. The locking-segment G is also secured to said platform, by which the hand adjusting-lever H, which is mounted on the crank-shaft E, is held in different positions. By these means the proper position of the tedder-frame with respect to the thills and ground is secured. The tedder-frame is mounted upon an axle I, carried by supporting-wheels J. The sprocket-wheel K is loosely mounted on the axle I, and has teeth on the inner face of its hub whereby it may be alternately engaged and disengaged by means of a clutch L, also mounted on the axle and of any approved construction. The clutch is actuated by a lever M and rod N and yoke N', a spiral spring O on the rod N tending to keep the clutch in contact with the teeth on the hub of the sprocket-wheel, and an incline-faced segment P serving to throw the clutch out of engagement when the lever M is actuated in the direction of the arrow in Fig. 1. While I have described these clutch-actuating devices, I wish to be understood as not confining myself to them, as they form no part of the invention.

The letter Q designates the tedder-shaft, which is mounted in suitable bearings in the rear part of the main frame and is rotated by the sprocket-wheel K through the sprocket-chain R and the sprocket-pinion S on the tedder-shaft. A roller T, mounted on a stud carried by the adjustable plate U on the side of the main frame, serves to take up the slack should any occur in the chain R. Thus it will be observed that a forward movement of the machine rotates the tedder-shaft in the direction of the arrow shown in Fig. 3. This shaft has fitted upon it a series of fork-holders consisting of metallic (preferably malleable iron) disks V, having sleeves W, by which they are mounted on the shaft, through a boss or thickened portion X of which extends a set-screw Y, whereby the holder is secured in place on the tedder-shaft. The disk V has an annular rim Z, slotted at intervals, as seen, for the passage therethrough of the forks *a*. The disk has also cast therewith on one of its sides short sleeves *b* and short studs *c*, around the former of which the forks are fitted, as seen in Fig. 4, and against the latter of which the forks bear and by which they are resisted when the strain of lifting the hay is brought upon their ends. The slots allow for any slight vibration of the forks that may occur. A covering-plate *d* is fitted against the rim Z and held in place by bolts *f'* and nuts *f*, the former passing through the sleeves *b*. This plate prevents the forks from dislodgment from the sleeves and studs. The forks consist of stout steel rods bent into substantially the form shown in Figs. 3 and 4, whereby they readily take hold of the hay and lift it from the ground as they are rotated. There are as many fork-holders placed on the tedder-shaft as may be desired, and each holder preferably carries three forks. I inclose the the tedder-shaft between the holders with the short sections $g$ of thin pipe or some material for the purpose of preventing the hay from becoming entangled with the shaft. These pipes at their ends are loosely fitted upon the peripheries of the covering-plates $d$, which allows them to tremble during the movement of the machine sufficiently to shake off the hay as fast as it falls upon them. Of course the amount of hay falling upon them is but small, and then again the diameter of these sections being large and their exterior being smooth the hay never permanently lodges upon them.

Inclined standards $h$ are secured at the rear end of the machine, preferably by being mounted on the tedder-shaft and held in a set position by means of plates $i$, secured to the main frame and bolted to the standards, as seen at $j$ in Fig. 3. This admits of adjusting the standards to different positions if it be desired. A rock-shaft $l$ is mounted in the bearings secured to these standards, and a number of light strong clearer-arms $m$ are secured to the shaft in any desired manner, as by means of the sleeves $u$. (Seen in Figs. 1, 3, and 7.) For each set of forks there is a clearer-arm, and by preference the arms are notched, as seen at $u'$ in Fig. 7, so as to work over and at the sides of each fork. A crank-arm $o$ extends from the shaft $l$ and is actuated by a pitman $p$, which at its lower end is fitted upon a stud projecting from the face of the pinion $q$, mounted on a short shaft extending from the side of the main frame. This pinion receives rotary motion from a sprocket-wheel $r$, mounted on the tedder-shaft, and through a sprocket-chain $s$. An adjustable roller $t$, similar to the adjustable roller T, serves to take up the slack of the chain $s$. The radius of the crank-arm $o$ being longer than the radius of the stud on which the lower end of the pitman $p$ is mounted the motion imparted to the shaft $l$ is a rocking motion and the motion to the clearer-arms a reciprocating rocking motion. It will be observed from the dotted lines in Fig. 3 that the clearer-arms in commencing their outward stroke intersect the forks at a point ahead of where the hay will usually rest, and that as the forks proceed in their rotation the arms move rearwardly until their relative position is about that shown in the full lines, at which point the clearer-arms have clearly passed beyond the ends of the forks. By the time the next succeeding line of forks reaches the position shown in the dotted lines in said Fig. 3 the clearer-arms will have returned to the position also shown in the dotted lines, and the operation just described will be repeated. In this way the forks are rapidly and thoroughly freed from their incumbent load of hay and the latter is given a sufficient rearward impetus to cause it to scatter and fall lightly upon the ground.

In Fig. 2 I have illustrated a modified form of the actuating mechanism to be used in lieu of the sprocket-pinion $q$, the sprocket-gear $r$, and the sprocket-chain $s$, if found desirable. The sleeves $b$ may be in the form of studs, if desired, and other holes formed for the bolts $f'$. The supporting-wheels are designed to be clutched to the axle, as suggested at $J'$ in Fig. 8, in which 1 represents a sleeve fitted rigidly on the axle and having a disk 2 and a rim 3, the latter being provided with ratchet-teeth, while a pawl 4 is pivoted to the inner face of the wheel-hub and arranged to engage the ratchet-teeth. Any other form of clutch mechanism may be employed, however.

Having thus fully described my invention, what I claim as new, and desire to secure by Letters Patent, is—

1. In a tedder, the combination, with the tedder-shaft, of a fork-holder consisting of a metallic disk having a central sleeve, a series of shorter sleeves and studs adjacent thereto, and a covering-plate, and forks bent round said shorter sleeves, fitted against said studs and extending radially beyond the disk.

2. In a tedder, a fork-holder consisting of a disk having a central sleeve to receive its shaft, a series of shorter sleeves and studs adjacent to the central sleeve, a covering-plate, and forks having the inner ends bent round said shorter sleeves and bearing against said studs and extending radially beyond the disk.

3. In a tedder, the combination, with the rotating tedder-shaft and tedder-teeth carried thereby, of a series of enveloping pipes loosely fitted over the tedder-shaft, whereby they jostle more or less when the machine is in motion and prevent the entanglement and winding of hay upon said shaft.

4. In a tedder, the combination, with a rotary tedder-shaft, a series of fork-holders consisting of a metallic disk having a ring around its periphery, and a central hub whereby it is mounted thereon, of a series of enveloping pipes placed around the shaft and loosely fitted upon the rims of said holders, whereby they prevent the lodging and entanglement of hay upon said shaft.

In testimony whereof I affix my signature in presence of two witnesses.

GEO. H. EARNEST.

Witnesses:
CHASE STEWART,
JAMES H. MAHAN.